March 22, 1949.  B. B. SCALES ET AL  2,465,173
SAFETY FUEL TANK
Filed Aug. 11, 1944
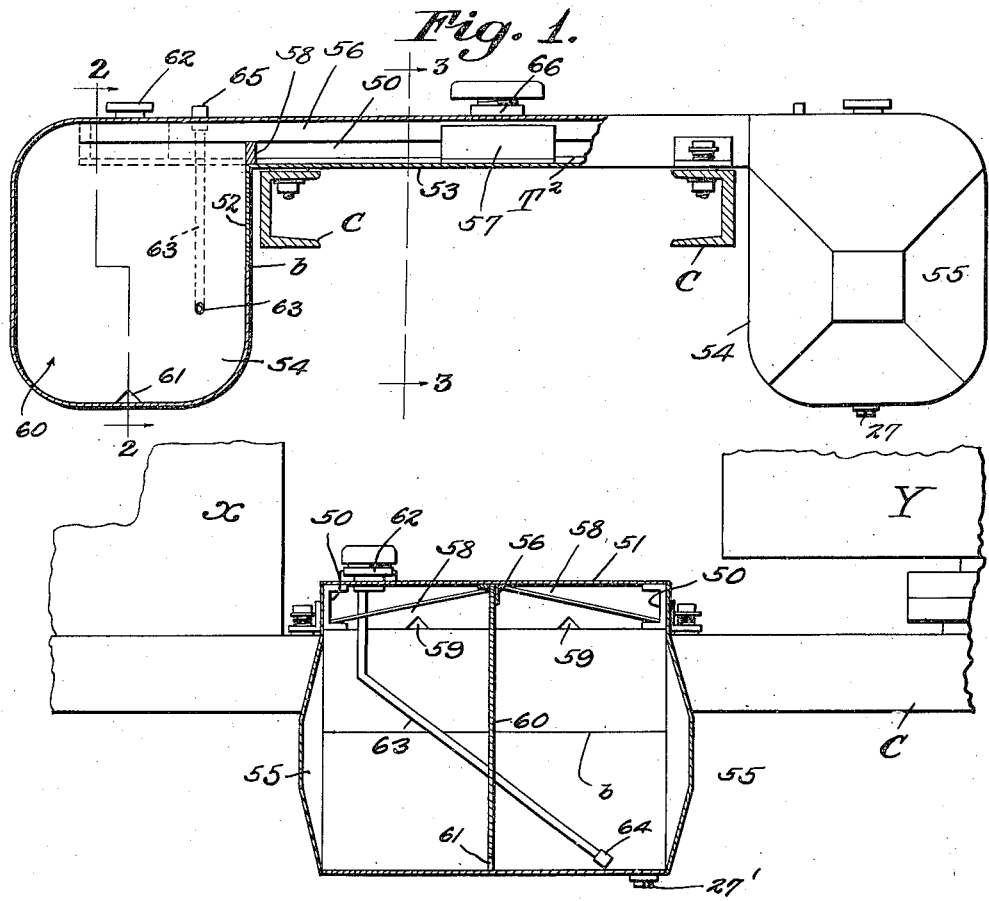
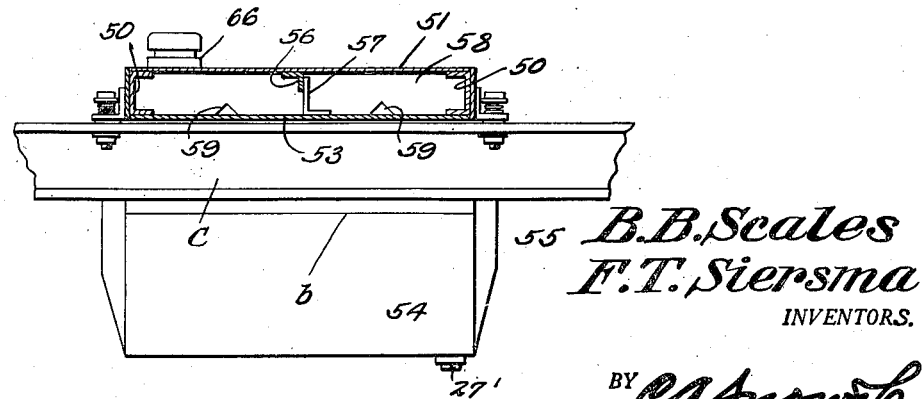
B.B. Scales
F.T. Siersma
INVENTORS.
BY *C.A. Snow & Co.*
ATTORNEYS.

Patented Mar. 22, 1949

2,465,173

UNITED STATES PATENT OFFICE 2,465,173

SAFETY FUEL TANK

Baxter Boyd Scales and Franklin T. Siersma,
Atlanta, Ga.

Application August 11, 1944, Serial No. 549,075

1 Claim. (Cl. 280—5)

This invention relates to safety fuel tanks for the transporting of gasoline used in connection with the operation of trucks and such like vehicles.

It has been found through experience and investigation by the Underwriters' Laboratories Inc., that the greatest hazard resulting from an accident or overturn of a gasoline propelled vehicle is fire taking place and feeding on the spillage of the liquid from broken fuel lines and from the vent of the common container of the vehicle. The flames surrounding the container cause extremely high pressure, from expansion, to explode the container, spreading highly volatile liquid over a large area causing further damage to property with the possible loss of life.

It is a fact well known that the size of any opening necessary to properly relieve a container subjected to fire varies with the size and strength of the container. Therefore it has been the aim through this invention to combine the greatest strength possible for the container with devices provided for sufficient and adequate release of gases generated in the container, and for prevention of spillage of liquid fuel as a result of overturning or collision.

Heretofore it has been found that tanks constructed with square corners or sharp bends stand very little pressure before buckling and springing leaks and in the case of pressure being built up in the tank as in the case of fire or like hazards explode at relatively low pressure causing such fire, if any, to be further fed from the liquid thus spread. An object of this invention is to provide a series of tanks or containers of sufficient strength to withstand relatively high pressures and therefore lower the liability of leaks and/or explosion.

The prime object of this invention is to furnish a container, or containers, of simple construction and of low manufacturing cost built with sufficient strength to withstand pressure and equipped with devices of adequate size and efficient operation to relieve any gases generated in the container for further eliminating the hazards of fire in connection with the operation of a motor, or similar vehicle.

A further object is to provide a tank structure having provision for carrying supplemental containers designed either for holding fuel or for items such as tools, etc.

With the foregoing and other objects in view which will appear as the description proceeds, the invention consists of certain novel details of construction and combinations of parts herein- after more fully described and pointed out in the claim, it being understood that changes may be made in the construction and arrangement of parts without departing from the spirit of the invention as claimed.

In the accompanying drawings the preferred form of the invention has been shown.

In said drawings

Figure 1 is a view partly in longitudinal section and partly in elevation showing a tank constructed in accordance with the invention.

Figure 2 is a section through one of the side containers taken on the line 2—2 of Figure 1 and showing the position which the tank can occupy back of the cab of a truck and in front of the trailer portion.

Figure 3 is a section on line 3—3 of Figure 1.

The tank constituting the present invention can be constructed in different ways to meet the requirements and is generally designed to be placed between the cab of a truck and the trailer portion thereof, the tank being extended transversely of the chassis and having structural portions extended laterally beyond the sides of the chassis. One form of the invention has been illustrated in Figs. 1, 2 and 3 wherein the channeled beams 50 extend transversely of the side beams of the chassis C of a truck or the like. The beams support a top plate 51 which is welded or otherwise joined thereto and extended downwardly, inwardly and upwardly to points b in Figures 1, 2 and 3. Here the plate 51 is joined securely by welding or the like to the terminals of a plate 52 which are extended upwardly to the beams 50 and merge into the bottom 53 of the intermediate tank $T^2$. The front and back of each supplemental tank 54 formed by the depending portions of the plates are closed by heads 55 which are joined to the outer surfaces of the beams 50 as shown particularly in Fig. 2. The main or intermediate tank $T^2$ can be reenforced by a longitudinal angle strip 56 having tie strips 57 extending downwardly therefrom to the bottom 53 as shown particularly in Fig. 3. Reenforcing strips 58 are located at the ends of the main or intermediate tank $T^2$ and have openings 59 in the bottoms thereof so that fluid can flow freely between the tanks.

Each of the supplemental tanks is braced by a baffle 60 extending transversely thereof from top to bottom and provided with one or more openings 61 at the bottom thereof. The reenforcing angle strip 56 can be extended into the supplemental tanks and the baffles 60 can be joined thereto as shown.

Each of the supplemental tanks has a filling opening provided with a cap 62 and also has an outlet tube 63 inclined downwardly and rearwardly, there being a check valve 64 at the lower end of the tube while the upper end can be provided with a suitable coupling 65. A pressure relief valve has been indicated at 66 and is located at the top of the main tank T².

This tank is adapted to extend transversely of the chassis and to be supported on the beams of the chassis. It is preferred to locate it directly behind the cab X of a truck and in front of the trailer portion Y. By reason of its peculiar construction, the tank is out of the way, will not readily become separated from the chassis, and affords space for a large supply of fuel which otherwise could not be carried.

The relief valve and the check valve have not been disclosed in detail because, obviously, valves of different types could be used. Importance is attached to the straddle construction whereby the tanks provide a deck at the rear of the cab and the containers forming a part of the invention, are located where they are out of the way but at all times readily accessible.

What is claimed is:

The combination with the chassis of a motor vehicle of a safety fuel tank including parallel beams bridging the chassis and extending beyond the sides thereof, top and bottom plates joined to the top and bottom faces of the beams, the top plate being formed from a single piece of material having its end portions extended beyond the sides of the chassis, said end portions being respectively bent downwardly to provide outer side walls of opposed side containers, inwardly to provide bottom walls for said containers, and upwardly at their ends to provide portions of inner side walls of said containers, the bottom plate having its ends respectively downturned to provide the remaining portions of the inner side walls of the containers, said top and bottom plates being joined at their ends, said walls being free from angles, heads closing the ends of said side containers, said beams and those portions of the plates joined thereto cooperating to provide an intermediate container extending from one side container to the other, a reinforcing element secured to the bottom of that portion of the top plate between the beams, a stiffening connection between said reinforcing means and the bottom plate, said plates and beams cooperating to form a deck bridging the chassis, and pressure release means opening through the deck and in connection with all of the containers.

BAXTER BOYD SCALES.
FRANKLIN T. SIERSMA.

REFERENCES CITED

The following references are of record in the file of this patent:

UNITED STATES PATENTS

| Number | Name | Date |
|---|---|---|
| 565,900 | Huber | Aug. 18, 1896 |
| 1,106,270 | Zagora | Aug. 4, 1914 |
| 1,727,609 | Kramer | Sept. 10, 1929 |
| 1,834,511 | Andrake | Dec. 1, 1931 |
| 2,181,772 | Snyder | Nov. 28, 1939 |
| 2,276,963 | Griffin | Mar. 17, 1942 |
| 2,314,298 | Welch | Mar. 16, 1943 |